United States Patent
Renner et al.

(10) Patent No.: US 7,173,668 B2
(45) Date of Patent: Feb. 6, 2007

(54) EQUILIBRIUM BASED HORIZONTAL SYNC DETECTOR FOR VIDEO DECODER

(75) Inventors: Karl Renner, Dallas, TX (US); Walter Heinrich Demmer, Nuremberg (DE); Jason M. Meiners, Richardson, TX (US); Weider Peter Chang, Hurst, TX (US); Airong Amy Zhang, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 598 days.

(21) Appl. No.: 10/623,232

(22) Filed: Jul. 18, 2003

(65) Prior Publication Data
US 2005/0018080 A1    Jan. 27, 2005

(51) Int. Cl.
*H04N 5/10*    (2006.01)
*H03L 7/00*    (2006.01)

(52) U.S. Cl. .................... 348/531; 348/540

(58) Field of Classification Search ............ 348/531, 348/530, 525, 540, 541
See application file for complete search history.

(56) References Cited

U.S. PATENT DOCUMENTS

| 4,470,066 A | 9/1984 | Wolber et al. |
| 6,317,161 B1 * | 11/2001 | Renner et al. .............. 348/536 |
| 6,330,034 B1 * | 12/2001 | Renner et al. .............. 348/536 |

* cited by examiner

*Primary Examiner*—Michael H. Lee
(74) *Attorney, Agent, or Firm*—Warren L. Franz; W James Brady, III; Frederick J. Telecky, Jr.

(57) ABSTRACT

The present invention discloses a horizontal sync detector circuit (10) comprising a filter portion (12), an equilibrium accumulator portion (14) coupled to the filter portion (12), a horizontal sync detector portion (16) coupled to the filter portion (12) and to the equilibrium accumulator portion (14), and an output logic portion (18) coupled to the horizontal sync detector portion (16), the output logic portion (18) adapted to produce a phase error (116) based on a combination of a coarse phase error (108) and a fine phase error (112).

48 Claims, 8 Drawing Sheets

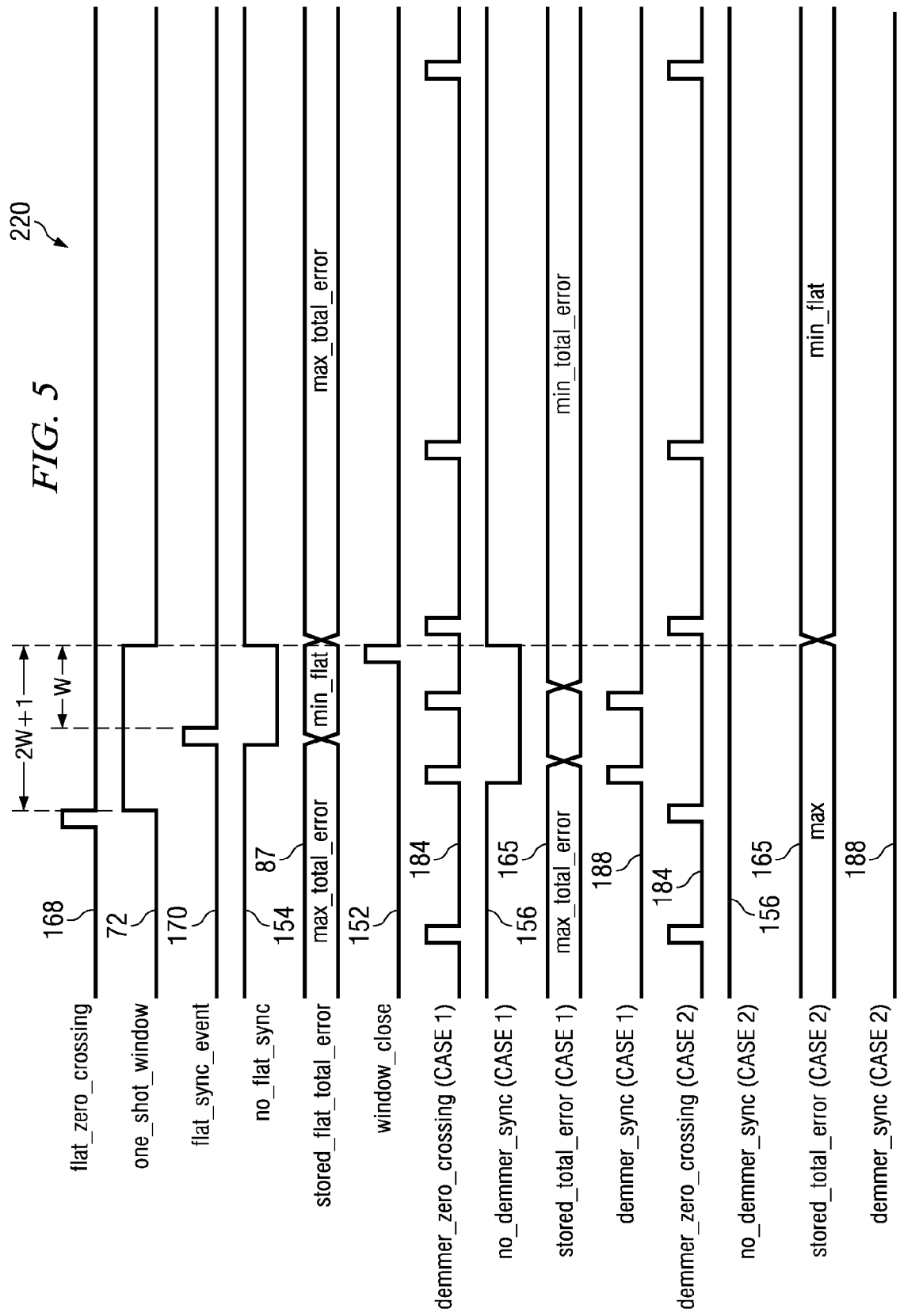

EQUILIBRIUM BASED HORIZONTAL SYNC DETECTOR FOR VIDEO DECODER

FIELD OF THE INVENTION

The present invention relates to horizontal sync detectors and, more particularly, to an equilibrium based horizontal sync detector for a video decoder.

BACKGROUND OF THE INVENTION

Conventional horizontal phase-locked loops (PLLs) for video decoders serve the purpose of locking the sampling clock (for clocking digital pixel information into the phase-locked loop) of an analog to digital converter (ADC) to the falling edge of the incoming horizontal sync of composite video information. This lock is required to generate a stable picture in the horizontal direction and position signals which identify the sync tip, back porch, the color burst, and the active video region of the composite video input. The analog video information enters an analog-to-digital converter which outputs digital pixel information. A pixel counter counts video information corresponding to pixels in what can be considered a horizontal scan line across a display monitor screen such as a cathode ray tube. The pixel counter starts with a count of zero and counts to a terminal count and then falls back to zero.

The PLL employs two modes of lock; a coarse lock and a fine lock. In the coarse lock mode the incoming horizontal sync pulse which is usually present during the blanking interval of each line associated with the video signal (for the purpose of being able to synchronize the scanning of the monitor with the scanning of the original image), is detected by a digital circuit. Based on the decode of the pixel counter, a coarse gate window (meaning a relatively wide time window in comparison with the narrow time window associated with the fine window discussed below) is enabled around the time the horizontal sync pulse is expected. If the sync does not occur within the gate window for a time corresponding to several consecutive video lines, then either the pixel counter is reset or a correction is made to the clock frequency of the video decoder system in order to move the window to the sync pulse. When the sync pulse falls within the fine lock window, then the fine lock mode is enabled.

A fine gate window is employed by the fine lock mode which enables a phase detector which calculates a phase error based upon the position of the edge of the sync pulse within a narrow window known as the fine window. This phase error is then filtered by a loop filter whose output is fed to a discrete time oscillator which adjusts the clock frequency to move the sync pulse so that its edge is centered in the fine window, thereby minimizing the phase error.

The sync detector detects the horizontal sync and outputs the phase error which represents its deviation from the desired lock position. It is highly desirable for the sync detector to work with non standard video and weak signal inputs. Non standard video is output by VCRs, DVD players, and video, for example. A VCR may produce a signal whose time base is unstable and depends upon its modes of operation which include normal play or trick mode (pause, fast forward, and rewind). The horizontal sync frequency may vary up to 5% from the nominal. Head switching can produce horizontal sync jumps up to 15 microseconds from its normal position before the vertical sync interval. During trick modes, the number of lines per frame may also vary by +/−6% and the vertical sync may change shape.

Copy protection, such as macrovision, is added to the video signal and presents additional problems with horizontal and color lock as well as automatic gain control (AGC) adjustment in the analog front end. Macrovision consists of distortions such as pseudo syncs, AGC pulses, color stripes, and sync height differences between the vertical blanking and active video intervals. Pseudo syncs can interfere with horizontal lock if they are misinterpreted as real syncs. Weak signals occur due to the reception of weak RF signals from a distant transmitter; they may also have a reduced sync amplitude caused by saturation of the RF antenna amplifier. Weak signals may also contain ghosts or echoes due to multipath reception caused by reflections of the RF off objects such as mountains, airplanes, and buildings.

Previous sync detectors consist of a separate coarse detector and a fine detector. The coarse detector detects the falling edge of sync in the filtered ADC output when it goes below a fixed trigger level. The fine detector generates a phase error based on the accumulation of, for example, 15 weighted pixels that fall within a narrow window. A limitation of having a separate coarse detector and fine detector is a non-uniform linear transfer function which produces an abrupt or sudden change in the phase detector characteristic when switching from a coarse mode to a fine mode resulting in horizontal jerkiness and/or oscillations in the picture. A normalization constant which is a function of the fixed trigger level is applied to the result in order to generate a zero crossing corresponding to the falling sync edge. The correct trigger level is critical to proper sync detection which, in turn, depends on AGC and offset adjustments in the analog front end to generate the correct levels for horizontal sync tip and back porch.

Other limitations of previous sync detectors include requiring synchronization to the input video signal and requiring automatic gain and offset adjustments in the analog front end. The video decoder must be fine locked to the input signal before the analog front end can adjust its gain and offset to achieve target sync height and back porch levels at the ADC output; the trigger level is set to the midpoint of these two levels. Therefore, the signal at the ADC output prior to lock must already be in the range where it can trigger sync detection. As a result, the range of input signal amplitude is limited over which lock can be achieved.

It is therefore desirable for the present invention to overcome the limitations and problems described above that are involved in a horizontal sync detector.

SUMMARY OF THE INVENTION

The present invention achieves technical advantages as an equilibrium based horizontal sync detector for a video decoder that provides an accurate phase error based on a valid detected sync.

In one embodiment, a horizontal sync detector comprises a filter portion, an equilibrium accumulator portion coupled to the filter portion, a horizontal sync detector portion coupled to the filter portion and to the equilibrium accumulator portion, and an output logic portion coupled to the horizontal sync detector portion, the output logic portion adapted to produce a phase error based on a combined coarse phase error and a fine phase error.

In another embodiment, a method for determining phase error in a sync detector comprises producing a flat phase error based on a flat filter output and on an equilibrium accumulator trigger level, producing a level error based on the flat phase error, producing a position error based on a modified pixel count, producing a total error based on the position error and on the level error, producing a coarse phase error based on the modified pixel count, producing a fine phase error based on the level error and a previous level error, and outputting a total phase error based on the fine phase error and the coarse phase error.

A further embodiment of the present invention involves a method for determining phase error in a horizontal sync detector. The method comprises receiving pixels at a plurality of filters, outputting a flat filter based on the filtered pixels to a plurality of accumulators, outputting a trigger level by the plurality of accumulators based on the flat filter output, producing a flat phase error based on the flat filter output and on the trigger level, and producing a level error based on the flat phase error.

BRIEF DESCRIPTION OF THE DRAWINGS

FIG. 5 illustrates timing signals of the horizontal sync detector circuit described in FIG. 4 in accordance with an exemplary embodiment of the present invention.

DETAILED DESCRIPTION OF THE INVENTION

Figure 1A:
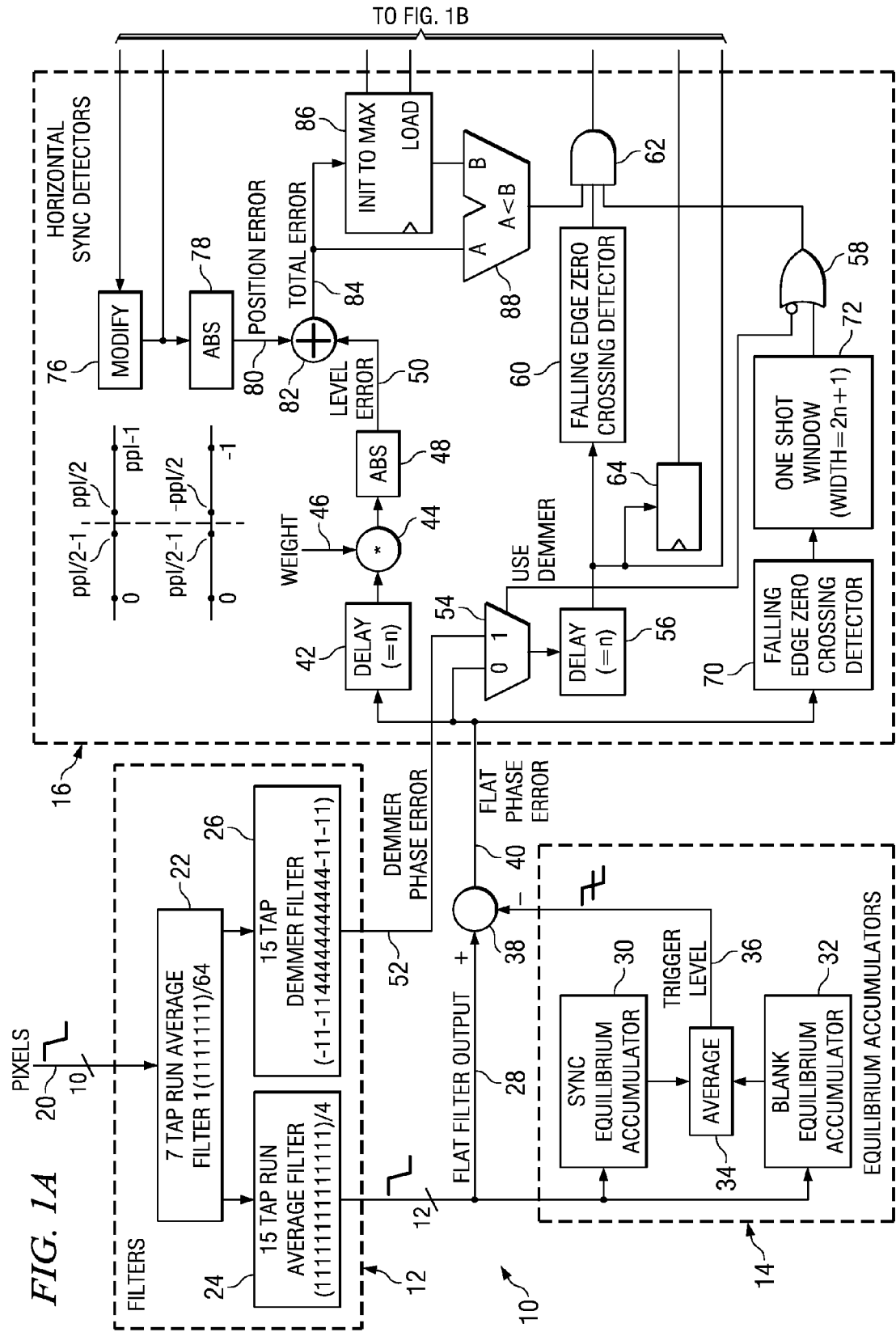
FIG. 1 illustrates a horizontal sync detector circuit in accordance with an exemplary embodiment of the present invention.
Figure 1B:
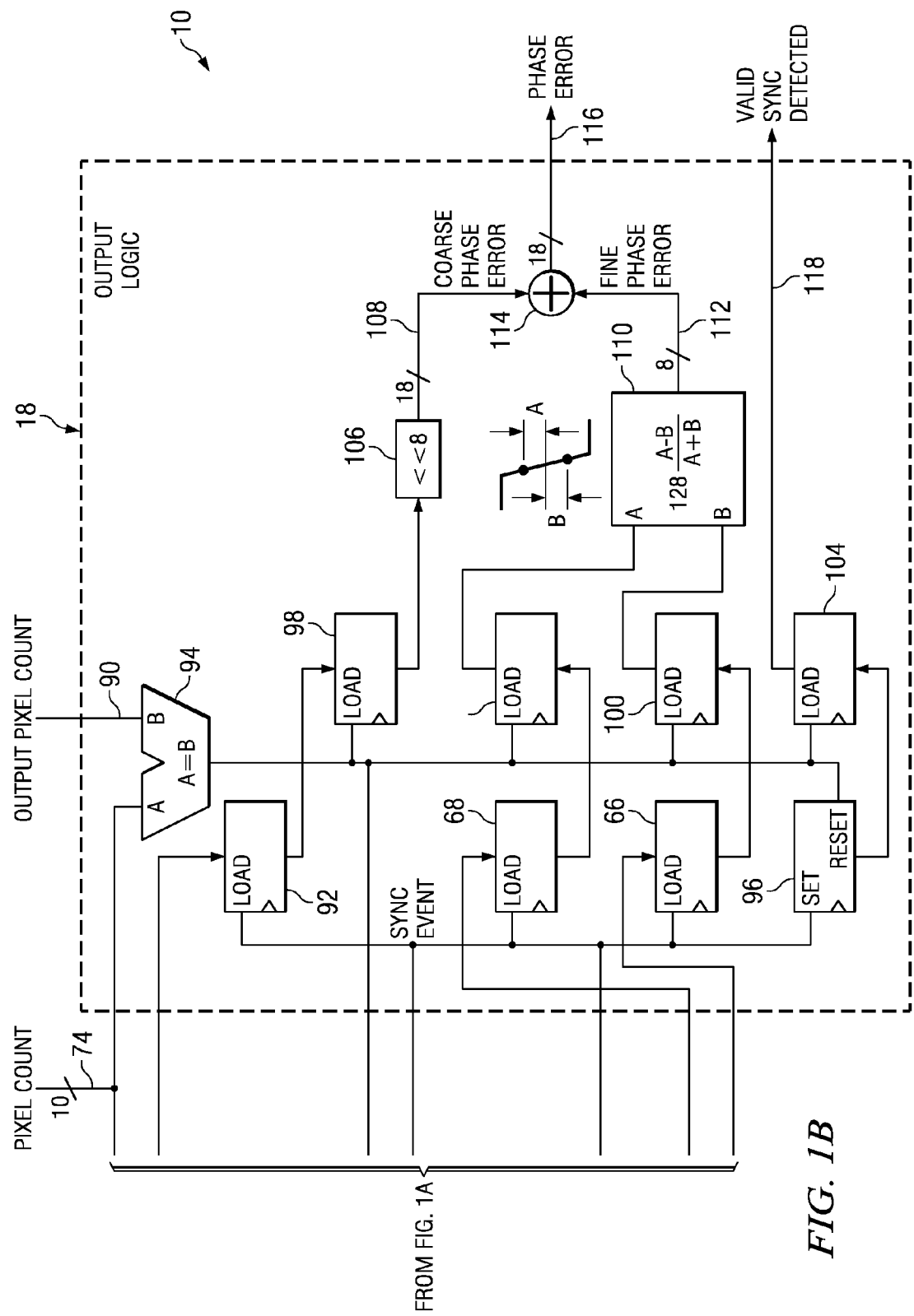

Referring now to FIG. 1, a horizontal sync detector circuit 10 of the present invention is presented. The circuit 10 comprises a filter portion 12, an equilibrium accumulator portion 14 coupled to the filter portion, a horizontal sync detector portion 16 coupled to the filter portion and to the equilibrium accumulator portion, and an output logic portion 18 coupled to the horizontal sync detector portion.

Pixels 20 from an ADC (not shown) are input to the filters 22–26 which eliminate noise and the color subcarrier. The low pass filters consist of a 7 tap running average filter 22 (averaging a window of 7 pixels) whose bandwidth is about 860 kHz and a 15 tap running average filter 24 (averaging a window of 15 pixels) whose bandwidth is between about 590 kHz and about 1200 kHz. The 7 tap running average filter 22 feeds into the 15 tap running average filter 24 and a 15 tap Demmer filter 26, which is a band pass filter that blocks DC and is not sensitive to shifts in DC levels (as opposed to the low pass filters 22 and 24 that pass DC). The 15 tap running average filter 24 outputs a flat filter output 28. The flat filter constitutes an FIR lowpass filter consisting of a set of 15 identical coefficients (flat window) while the Demmer filter constitutes an FIR bandpass filter consisting of a set of 15 symmetrical coefficients (Demmer window). The flat phase error and the Demmer phase error describe the phase error terms derived from the respective filters.

The flat filter output 28 is fed into a sync equilibrium accumulator 30, which determines sync tip levels, and into a blank equilibrium accumulator 32 which determines blanking levels. A line of composite video signal consists of a horizontal blanking interval during which sync and color burst occur. The sync level is the most negative level in the signal (at 40 IRE (NTSC) or 43 IRE (PAL) below the blanking level). The blanking level extends into the active video area and corresponds to black. The principle of floating equilibrium is used to establish the levels for sync tip and blanking, and does not require synchronization to the input signal nor automatic gain and offset adjustment in the analog front end; floating means that these circuits run on their own all the time and adapt to the input signal. The sync tip levels and the blanking levels are averaged at block 34 to produce a trigger level 36. Since the equilibrium levels adapt to the input, the trigger level 36 will be set to the correct level for sync detection. A sync event occurs when the filtered pixel input falls below the trigger level. The trigger level 36 is subtracted from the flat filter output 28 at block 38 producing a flat phase error 40. In a sense, the trigger level is being drawn through a sync falling edge, so whenever a zero crossing of the trigger level occurs, the presence of sync will be detected.

The flat phase error 40 feeds into several points. One of the points is a delay 42, which compensates for other delays in the horizontal sync detectors portion 16. The flat phase error 40 that is output is then multiplied at multiplier 44 by a weighing value 46 which establishes its relative contribution to the total error. An absolute value of the output is then taken at block 48 thus producing a level error 50.

The 15 tap Demmer filter 26 outputs a Demmer phase error 52 which is input into a multiplexer 54. The muliplexer 54, which is another point that the flat phase error 40 feeds into, selects either the flat phase error 40 or the Demmer phase error 52 based on a set bit. The Demmer phase error 52 may be preferable because it produces a more stable sync and less rippling on vertical edges in a frame. The output from the multiplexer 54 is fed into a delay 56 and, in the case where the Demmer phase error 52 is to be used, the output is inverted into OR gate 58. From the delay 56, the output is sent to a falling edge zero crossing detector 60, where a zero crossing falling edge is indicated for the trigger level 36 (in the case of the 15 tap run average filter 24 output) and where a zero crossing is indicated in the case of the 15 tap Demmer filter 26 output (there is no trigger involved with a Demmer filter). The output from the falling edge zero crossing detector 60 is received at an AND gate 62.

Prior to reaching the falling edge zero crossing detector 60, the output is also sent to a register 64 where a sample of a previous flat phase error is stored and to register 66 where the current flat phase error is stored. The contents of the register 64, which comprises the previous level error, are sent to a register 68. In order to generate fine phase error (discussed below in greater detail), samples of the previous phase error sample and the current phase error sample are used.

The falling edge zero crossing detector 70, which is another point that the flat phase error 40 feeds into triggers a one shot window 72. A flat sync triggers the one shot window 72 (that is usually about 15 pixels wide) which qualifies a Demmer sync event (the Demmer sync event has to fall within the one shot window 72 within the vicinity of the flat sync event in order to be qualified). The window is required because the Demmer filter is a bandpass filter and may output many edges that correspond to sync and active video. The output from the one shot window, as well as the inverted output are received by the OR gate 58 whose output (i.e. the Demmer window) is then received at the AND gate 62. The AND gate outputs a sync event which is a falling edge of sync.

A pixel count 74 of the pixels 20, which falls between 0 and pixels per line minus 1 (ppl−1), is modified at modifier 76, to fall between −ppl/2 and ppl/2 −1 so that the horizontal PLL will lock in the shortest time possible. The pixel count will range from zero to pixels per line −1 and then resets to zero. The modifier 76, modifies the pixel count to where if the count is between 0 and ½ the pixels per line, it is going to be that same value. If, however, it is greater than ½ the pixels per line then it is going to be a negative value that ranges from −1 to −pixels per line/2. Again, this is done to drive the PLL to the lock position in the shortest amount of time.

An absolute value of the modified pixel count is produced at block 78 and results in a position error 80. The level error 50 and the position error 80 are added at adder 82 to produce a total error 84 which is input into a register 86. Whenever the pixel count 74 reaches the halfway point in a line, an output pixel count 90 reinitializes the register 86 to a maximum value. Therefore, for each line, a sync event that minimizes the total error in the register 86 is preferred. The (current) total error 84 and the output of the register 86 (the stored total error) are compared in comparator 88. If the current total error 84 is less than the stored total error, the AND gate 62 is enabled.

The modified pixel count from the modifier 76 is also stored at register 92, as well as registers 66, 68, and 96. The contents of registers 92, 66, 68, and 96 are respectively stored in registers 98, 100, 102, and 104 when the pixel count 74 equals the output pixel count 90 (which is usually the halfway point of the line) at a comparator 94. The stored total error is also initialized to a maximum value at the register 86. A valid sync event occurs when the total error is less than the stored total error.

The contents of the register 98 (the modified pixel count) are left shifted 8 bits, for example, by shift register 106. The resulting eighteen most significant bits (MSBs), for example, produce a coarse phase error 108. The registers 100 and 102, which contain current and previous level error samples respectively, provide the current phase error (b) and the previous phase error (a) to block 110 that produces a fine phase error 112 which is an eight bit result, for example, that varies between −128 . . . 0 . . . +128. When perfect lock is obtained, the two level error samples are centered about the trigger level such that a=b=0 and the pixel count 74 is zero. The coarse phase error 108 and the fine phase error 112 are added at adder 114 to output a combined eighteen bit, for example, total phase error 116 (which comprises the shifted coarse phase error plus the fine phase error).

The horizontal PLL (not shown) works to drive the phase error 116 to zero so when the perfect lock is obtained, two level error samples are equally spaced from the trigger level. In such a case, a and b are equal to zero and the fine phase error 112 is also equal to zero. For each valid sync event, buffer registers 98–104 are updated with the coarse phase error 108, the current and previous level errors, and a valid sync detected bit 118 which qualifies the phase error 116 as being valid. For example, there are some signals such as VCR trick modes, where no horizontal syncs are present during the time vertical syncs are present. In such a situation, the vertical sync interval is largely ignored and the phase error is not processed. The total phase error 116 is then read, for example, by a microprocessor (not shown), processed, filtered and written out to a discrete time oscillator increment control that controls the frequency of the sampling or system clock.

In summary, the trigger level 36 for horizontal and vertical sync detection is obtained from the average 34 of the sync tip and blanking levels. Since the equilibrium levels adapt to the input, the trigger level 36 will be set to the correct level for sync detection. A sync event occurs when the filtered pixel input falls below the trigger level 36. The corresponding pixel count 74 provides the position error 80. Since the position error 80 is also driven to zero, the falling edge of sync will align with a pixel count of zero. Syncs buried in weak noisy signals can be detected due to their periodic nature and constant position error. The difference between the trigger level 36 and the input sample is the level error 50. The total error 84 is the sum of the position error 80 and the level error 50. For each line, the sync detector 10 outputs the phase error 116 corresponding to the minimum total error 84. The horizontal PLL works to minimize the total error 84 and drive the phase error 116 to zero.

Figure 2:
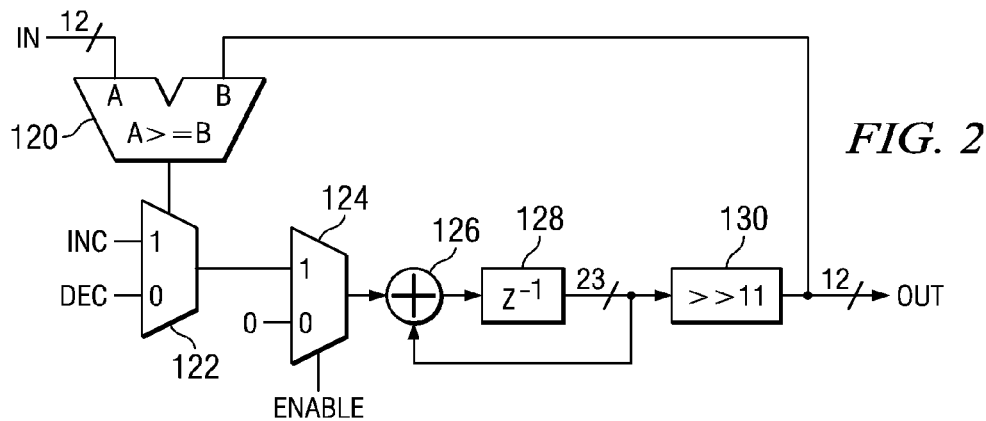
FIG. 2 illustrates an equilibrium accumulator circuit in accordance with an exemplary embodiment of the present invention.

Referring now to FIG. 2, a diagram for the equilibrium accumulator which is used for both the sync 30 and blanking 32 is presented. The equilibrium accumulator is a 23 bit register whose 12 MSBs are compared with an input from the flat filter output at a comparator 120. An enable input can be used to disable or freeze the equilibrium level. If the input is greater than or equal to the MSBs, then an increment value is selected; else, the decrement value is selected by the multiplexer 122 and appears at its output. The increment and decrement values are chosen based on the ratio of sync/blank timing to the line time. The output from multiplexer 112 is input to multiplexer 124 which selects this input when enable is true or 0 when enable is false and the freeze accumulator mode is desired. The output from the multiplexer 124 is received at the adder 126 whose output is fed to the accumulator 128. The output from the accumulator 128 represents the floating equilibrium level for blanking or sync levels. This output is added with the output from the multiplexer 124 which represents the accumulation process and is passed to a shift register 130, where the output is right shifted 11 bits, for example. This shift sets a very large time constant which results in a very slow variation in the equilibrium level with respect to input changes. The output is fed to the average block 34 which outputs the trigger level.

Figure 3:
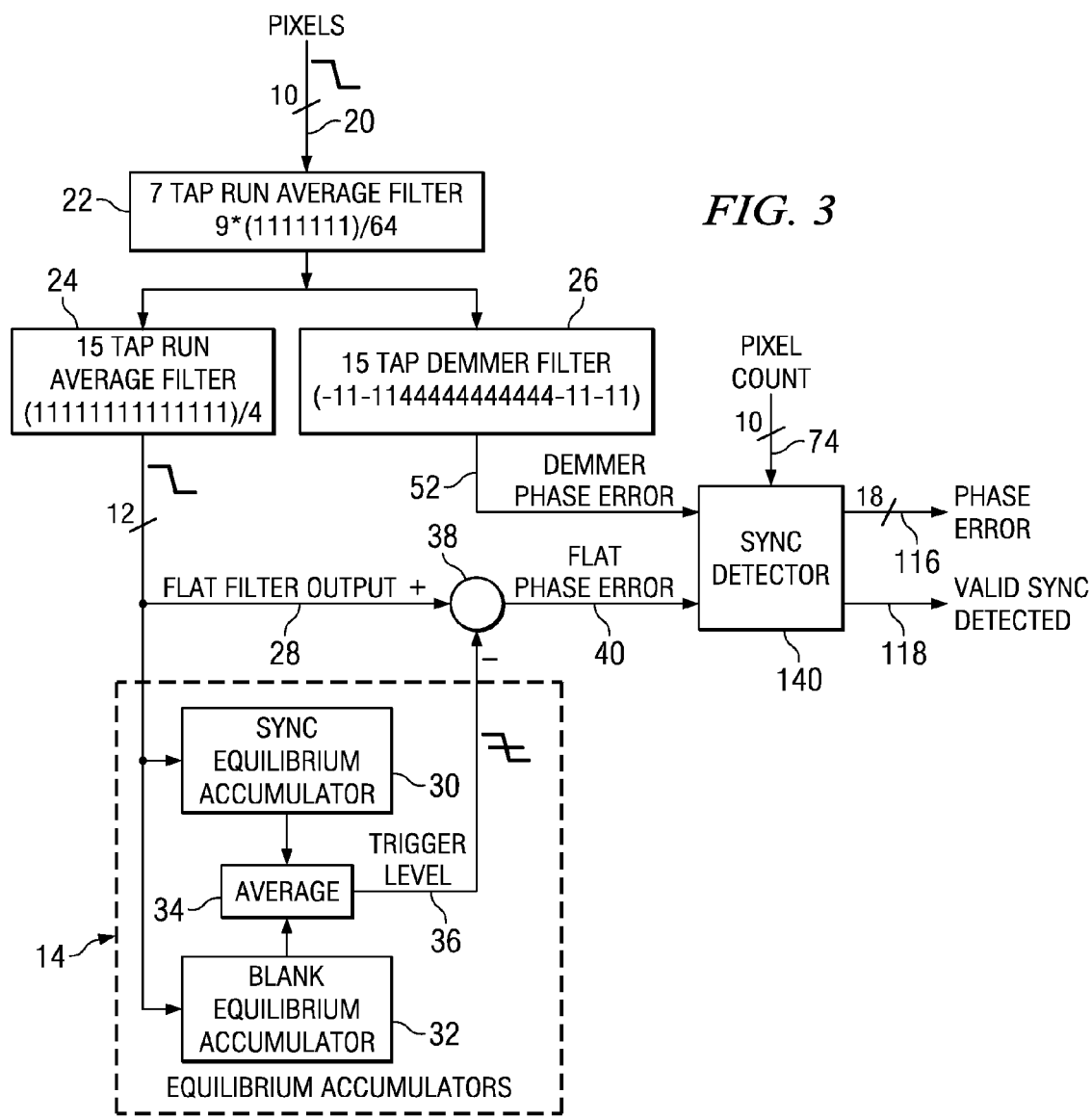
FIG. 3 illustrates a block diagram of a horizontal sync detector in accordance with an exemplary embodiment of the present invention.

Referring now to FIG. 3, a block diagram of a horizontal sync detector is presented. The preferred embodiment of the horizontal sync detector circuit 140 is described below in reference to FIG. 4. Similar elements of the horizontal sync detector circuit 10 are depicted with similar reference numerals in the horizontal sync detector circuit 140 of FIG. 4.

Figure 4A:
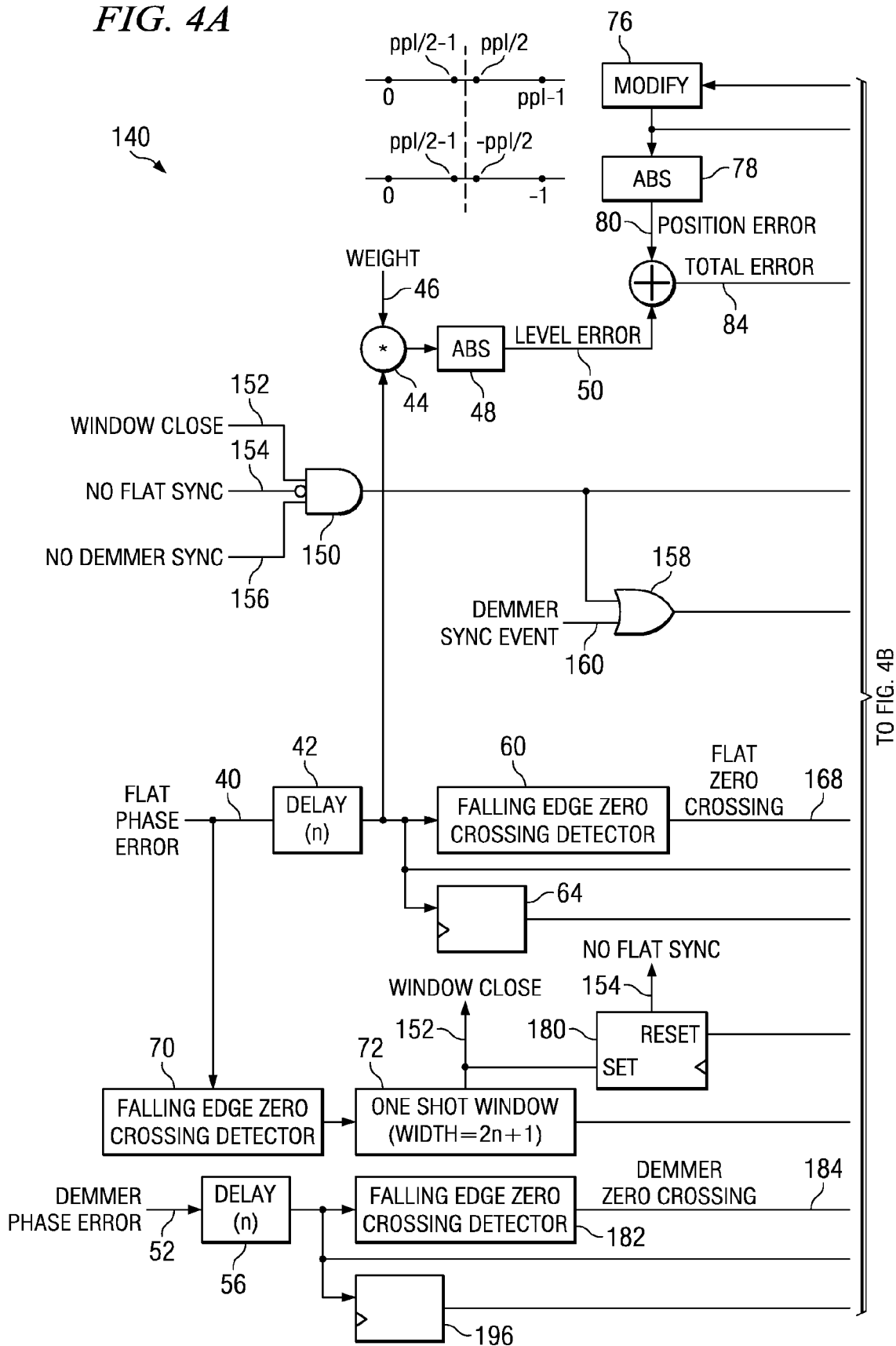
FIG. 4 illustrates another horizontal sync detector circuit in accordance with an exemplary embodiment of the present invention.
Figure 4B:
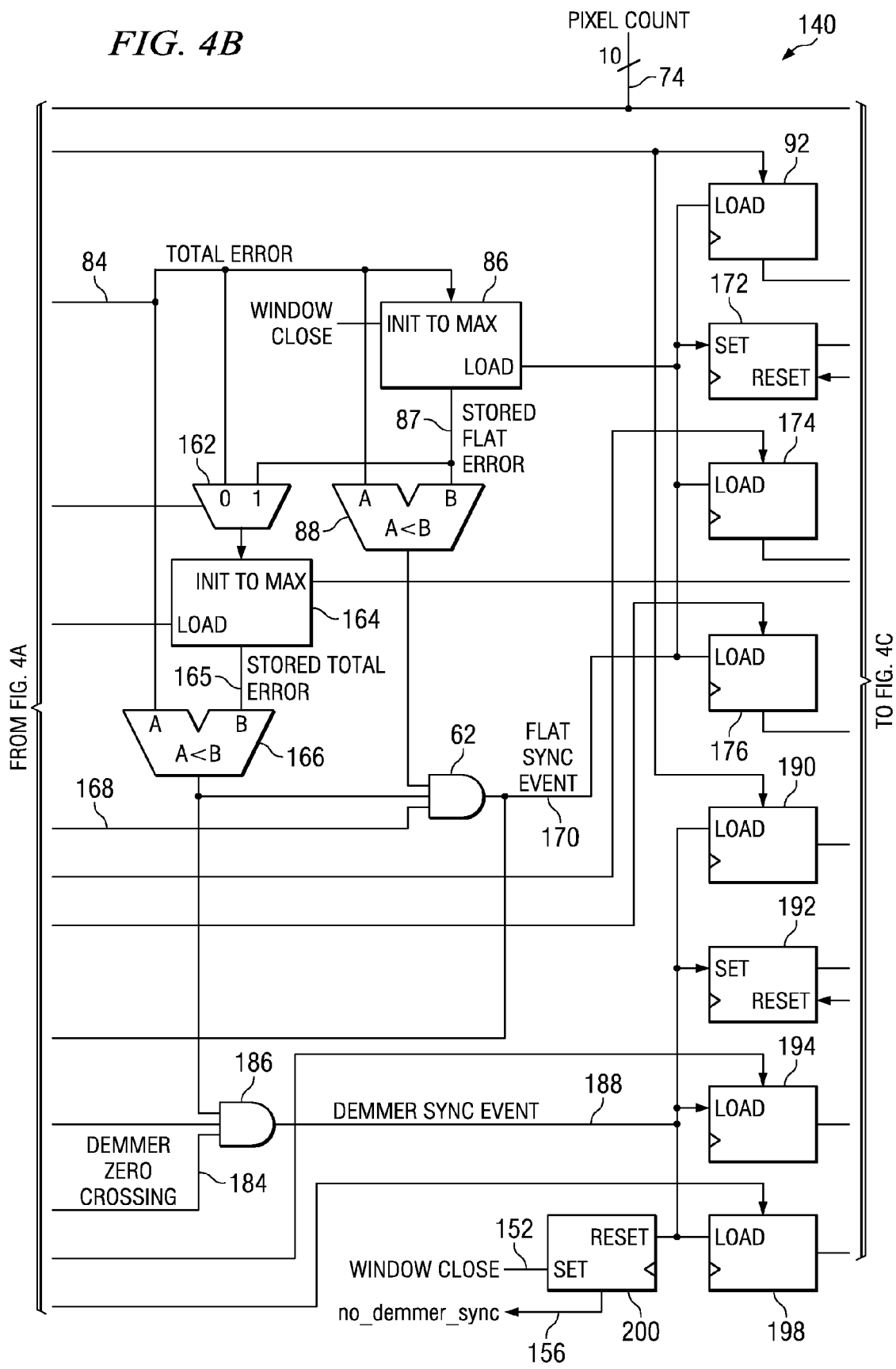
Figure 4C:
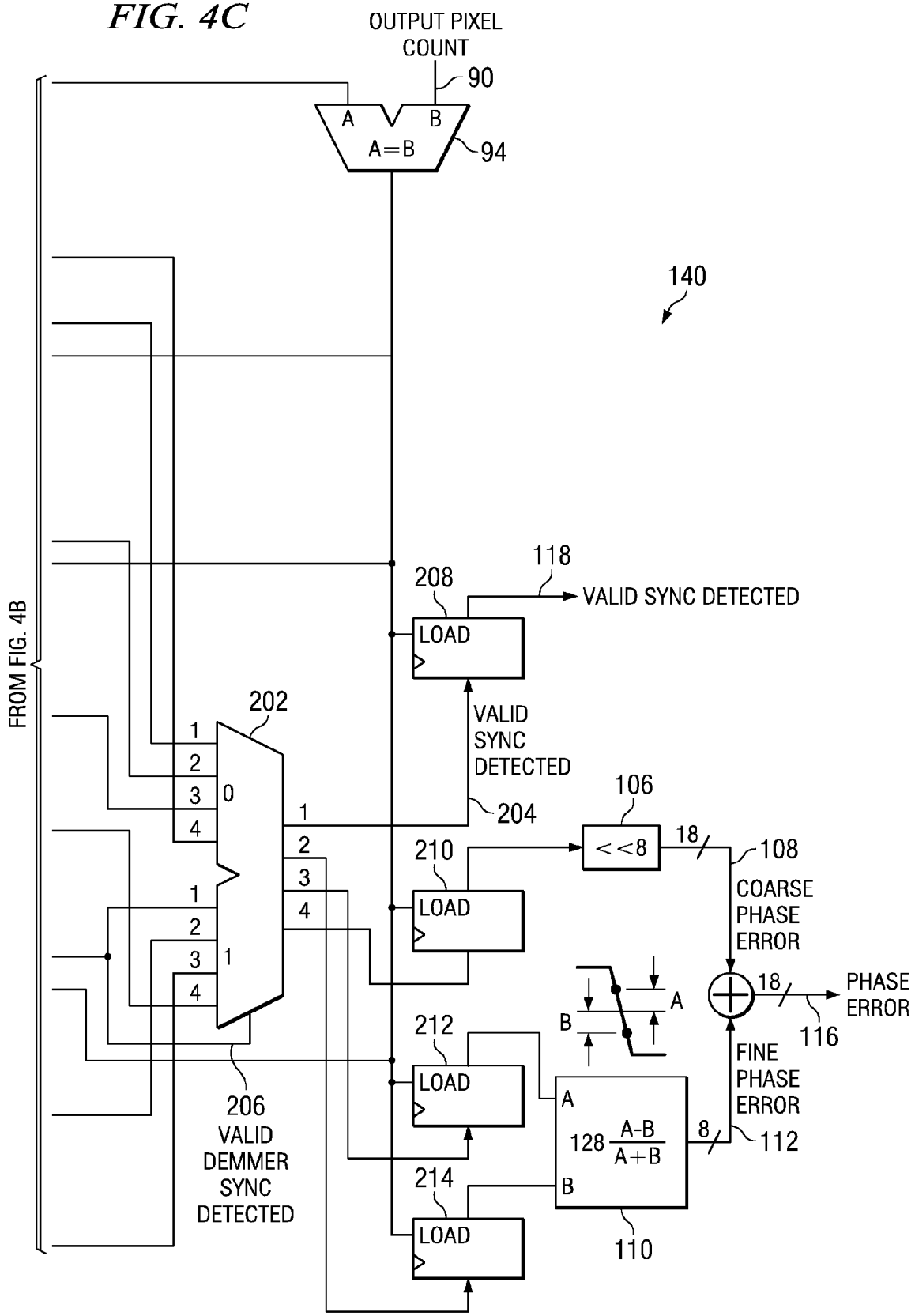

Referring generally now to FIG. 4, a sync event is detected in the two parallel inputs consisting of the flat phase error 40 and the Demmer phase error 52. Since a Demmer sync event is not DC sensitive, which results in small jitter, it has priority over a flat sync event provided that it falls within a window triggered by the flat sync event. If no Demmer sync event occurs within the window, then the flat sync event is selected by default. For each horizontal line, a pixel counter counts a fixed number of pixels from 0 to the pixels per line minus one. For each sync event, there is a position error 80 and a level error 50 whose sum is the total error 84. The horizontal PLL 140 works to minimize the total error 84. The position error 80 is based on the absolute value 78 of the modified 76 pixel count 74 (falling between −ppl/2 and ppl/2−1 which enables the PLL 140 to drive itself to the lock position in the shortest possible time.

The level error 50 associated with the flat phase error 40 is the absolute value of the distance of its sample from the trigger level. The sync event which minimizes the total error becomes the final valid sync event. The stored flat total error register 86 stores the total error 87 whenever a sync event based on the flat phase error 40 occurs. A flat sync event 170 triggers a one shot window 72 to open whose width is 2n+1 (or 2w+1) pixels where n is a programmable parameter. The flat total error register 86 is always initialized to a maximum value when the window 72 closes so that all possible flat sync events may be examined.

When a sync event occurs in the Demmer phase error 52, its total error is stored in another register called the stored total error register 164. If no Demmer sync event occurs within the one shot window, the stored total error register 164 is updated with the contents of the flat total error register 86 when the one shot window closes. This register is reset to a maximum value when the pixel counter reaches the output pixel count so that for each line a new search for the Demmer sync event is initiated.

For each sync event, output buffer registers are updated with a valid sync detected flag, the course phase error 108, the level error 50, and the previous level error associated with the flat and Demmer sync events. When the pixel count 74 reaches the output pixel count, a multiplexer 202 selects the output buffer register contents which are transferred to output registers. The multiplexer output is selected based on the valid Demmer sync event detected flag. A fine phase error 112 is generated by a divider 110 which generates an eight bit result which varies between −128 . . . 0 . . . +128. When perfect lock is obtained, the two level error samples are centered about the trigger level such that a=b=0 and the pixel count is zero. The coarse phase error 108 and the fine phase error 112 are added to output a combined total phase error 116. A valid sync detected flag 118 which qualifies the phase error 116 is also output.

More specifically, the horizontal sync detector circuit 140 includes an AND gate 150. If the one shot window 72 is closed 152 (a pulse that occurs when the window closes), a flat sync occurred (the no flat sync 154 is TRUE if no flat sync occurs), and no Demmer sync 156 occurred (which is TRUE if no Demmer zero crossing falls within the one shot window) then the stored total error 165 is loaded with total error 84. If the AND gate 150 or the Demmer sync event 160 (which is TRUE if a Demmer sync event occurs within one shot window 72) is TRUE at the OR gate 158, a register 164 loads a value at its input. The register (or the stored total error register) 164, loads the total error when the Demmer sync event 160 or the AND gate 150 is TRUE.

A multiplexer 162 selects the total error 84 or the stored flat total error 87 as its output to the register 164 and the stored total error 165 is output from the register 164. A comparator's 166 output is TRUE when the total error 84 is less than the stored total error 165. A flat sync event 170 (output from the AND gate 62) is TRUE when a flat zero crossing 168 is TRUE (which is TRUE when the delayed flat phase error from the delay block 42 crosses zero in a negative direction) and when the total error 84 is less than the stored total error 165 is TRUE.

Registers 172–180 will now be described. The register 172 is reset when the pixel count 74 is equal to the output pixel count 90 and is set when the flat sync event 170 is TRUE, the register 174 loads with the delayed flat phase error from the delay block 42 when the flat sync event 170 is TRUE, the register 176 loads the previous delayed flat phase error from the block 64 when the flat sync event 170 is TRUE, and the register 180 is set when the one shot window 72 closes 152 and resets when the flat sync event 170 is TRUE.

A falling edge zero crossing detector generates a Demmer zero crossing 184 when the delay demmer phase error from the delay block 56 crosses zero in a negative going direction. An AND gate 186 is TRUE when the Demmer zero crossing 184 is TRUE, the one shot window output from the one shot window 72 is TRUE, and the total error 84 is less than the stored total error 165. In such a situation, a Demmer sync event 188 is output from the AND gate 186.

Registers 190–200 will now be described. The register 190 loads with the Demmer sync event modified pixel count from the modify block 76 when the Demmer sync event 188 is TRUE, the register 192 is reset when the pixel count 74 equals the output pixel count 90 and is set when the Demmer sync event 188 is TRUE (and further outputs a valid Demmer sync detected 206), the register 194 loads with the delayed Demmer phase error from the delay block 56 when the Demmer sync event 188 is TRUE, the register 196 loads the delayed Demmer phase error from the delay block 56, the register 198 loads the previous delayed Demmer phase error from the register 196 when the Demmer sync event 188 is TRUE, and the register 200 is set when the window close 152 is TRUE and resets when the Demmer sync event 188 is TRUE.

A multiplexer 202 selects the flat inputs 1–4 or the Demmer inputs 1–4 based on a valid Demmer sync detected 206. Registers 208–214 will now be described. The register 208 loads with the multiplexer 202 output 1 valid sync detected 204 when the pixel count 74 equals the output pixel count 90, the register 210 loads with the multiplexer 202 output 4 modified pixel count when the pixel count 74 equals the output pixel count 90, the register 212 loads with the multiplexer 202 output 3 previous phase error when the pixel count 74 equals the output pixel count 90, and the register 214 loads with the multiplexer 202 output 2 phase error when the pixel count 74 equals the output pixel count 90.

A previous phase error (a) and a current phase error (b) are provided to the block 110 that produces a fine phase error 112 which is an eight bit result, for example, that varies between −128 . . . 0 . . . +128. When perfect lock is obtained, the two level error samples are centered about the trigger level such that a=b=0 and the pixel count 74 is zero. The coarse phase error 108 and the fine phase error 112 are added at adder 114 to output a combined eighteen bit, for example, total phase error 116 (which comprises the shifted coarse phase error plus the fine phase error). The phase error 116 is attempted to be driven to zero so when the perfect lock is obtained, two level error samples are equally spaced from the trigger level. In such a case, a and b are equal to zero and the fine phase error 112 is also equal to zero. The total phase error 116 is then read, for example, by a microprocessor (not shown), processed, filtered and written out to a discrete time oscillator increment control that controls the frequency of the sampling or system clock.

FIG. 5 illustrates timing signals 220 of the horizontal sync detector circuit 140 including a first case showing a Demmer sync event that falls within the one shot window 72 that the stored total error register 164 updates with, and a second case showing a no Demmer sync event that falls within the one shot window 72. In this situation, the stored total error register updates with the flat total error 87 when the window 72 closes.

The timing signals 220 include a flat_zero_crossing 168, a one_shot_window 72, a flat_sync_event 170, a no_flat_sync 154, a stored_flat_total_error 87, a window_close 152, and the first and second cases that include a demmer_zero_crossing 184, a no_demmer_sync 156, a stored_total_error 165, and a demmer_sync 188.

More specifically, the flat_zero_crossing 168 is a logic signal which is 1 when the flat phase error has crossed the trigger level in the negative direction; the one_shot_window 72 is a logic signal which is 1 when triggered by the output of falling edge zero crossing detector 70; the flat_sync_event 170 is a logic signal which is 1 when a flat zero crossing 68 has occurred and the total error 84 is less than the stored total error 165 and total error 84 is less than the stored flat total error 87; the no_flat_sync 154 indicates that no flat sync event occurred during the one shot window; the stored_flat_total_error 87 is a stored minimum flat total error for a line; the window_close 152 is a logic signal that identifies the close of the one shot window generated by 72; for the case 1 and case 2 sync events that include a demmer_zero_crossing 184, it is a logic signal that identifies the crossing of zero in the negative direction; the no_demmer_sync 156 is a logic signal from the register 200 which is 1 if no Demmer sync occurs during the window 72; the stored_total_error 165 is output from register 164 which is the total error corresponding to a Demmer sync event; and the demmer_sync 188 is a logic signal which is 1 when the total error 84 is less than the stored total error 165, the one shot window output from 72 is 1, and the Demmer zero crossing 184 is 1.

Figure 6:
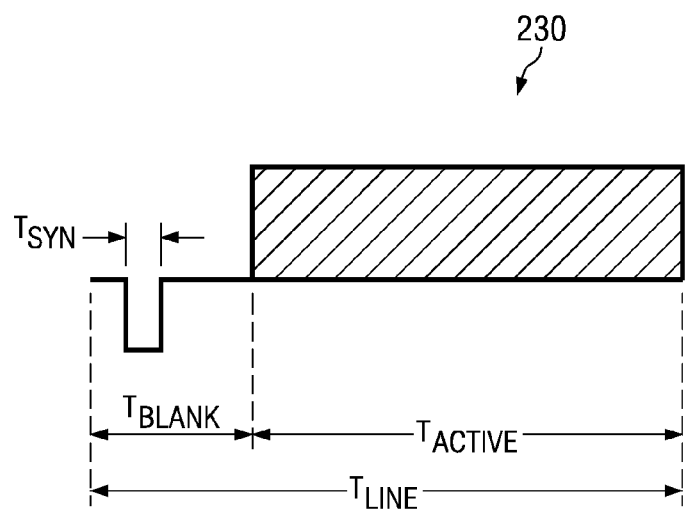
FIG. 6 illustrates composite video signals and timing ratios in accordance with an exemplary embodiment of the present invention.

Referring now to FIG. 6, one line of the composite video signal 230 is depicted. For the blank level equilibrium accumulator 32 the minimum and the maximum relative duration the filtered video signal stays at or above the blanking level is defined by the following equations:

$$\text{ratio}_{min} = (T_{line} - T_{blank}) / T_{blank} \quad (1)$$

$$\text{ratio}_{max} = (T_{line} - T_{sync}) / T_{sync} \quad (2)$$

If the dec/inc ratio used for the equilibrium accumulator complies with $\text{ratio}_{min} < \text{dec/inc} < \text{ratio}_{max}$, a floating equilibrium is achieved by the accumulator at the blanking level. Conversely, the sync tip level is obtained if $\text{dec/inc} > \text{ratio}_{max}$. Optimal safety margin can be achieved for the blank level equilibrium accumulator 32 using, for example, dec/inc=13/2=6.5 and for the sync tip level equilibrium accumulator 30 using, for example, dec/inc=20/1=20. The timing of the horizontal sync during the vertical sync interval differs from that during active video. As a result, the blank equilibrium level will sag and cause the trigger level 36 to decrease.

The macrovision sync height difference between active video and vertical blanking intervals also cause a problem. A change in the trigger level results in a shift in the lock position during and shortly after vertical sync which affects vertical edges and increases jitter. If a clean noise free standard video is detected at the input then the Demmer filter 26 output is selected instead of the flat filter output 28. Since the Demmer phase error 52 is insensitive to DC levels and not a function of the trigger level 36, stable lock can be achieved.

Since the Demmer filter is a bandpass filter, its output will generate a sync event not only for the horizontal sync edge but for any edge present in the video signal. A one shot sub window whose width is 2n+1 pixels is triggered by the flat phase error which corresponds to a true horizontal sync edge. The Demmer sync event should fall within the sub window in order to qualify a valid sync event. Delay blocks (n pixels) are present to compensate for the sub window. An alternative to the sag problem is a simple swap of the increment and decrement values during vertical sync because the timing of the blank and sync are opposite to that outside vertical sync.

Although an exemplary embodiment of the present invention has been illustrated in the accompanied drawings and described in the foregoing detailed description, it will be understood that the invention is not limited to the embodiments disclosed, but is capable of numerous rearrangements, modifications, and substitutions without departing from the spirit of the invention as set forth and defined by the following claims. For example, the processing depicted in FIGS. 1 and 2 can be achieved in software.

What is claimed is:

1. A horizontal sync detector, comprising:
   a filter portion;
   an equilibrium accumulator portion coupled to the filter portion;
   a horizontal sync detector portion coupled to the filter portion and to the equilibrium accumulator portion; and
   an output logic portion, coupled to the horizontal sync detector portion, the output logic portion adapted to produce a phase error based on a combined coarse phase error and a fine phase error.

2. The horizontal sync detector of claim 1, wherein the filter portion is adapted to output a flat filter to the equilibrium accumulator portion.

3. The horizontal sync detector of claim 2, wherein the equilibrium accumulator portion is adapted to determine at least one of a following level:
   blank;
   sync; and
   trigger.

4. The horizontal sync detector of claim 3, wherein the at least one of the following levels are determined utilizing a floating equilibrium principle.

5. The horizontal sync detector of claim 3, wherein the equilibrium accumulator portion is adapted to determine a flat phase error based on the flat filter output and the trigger level.

6. The horizontal sync detector of claim 5, wherein the flat phase error is adapted to be received by the horizontal sync detector portion.

7. The horizontal sync detector of claim 6, wherein the horizontal sync detector portion is adapted to generate a level error.

8. The horizontal sync detector of claim 7, wherein the level error is a function of the flat phase error.

9. The horizontal sync detector of claim 6, wherein the horizontal sync detector portion is adapted to generate potential sync events.

10. The horizontal sync detector of claim 9, wherein the potential sync events are generated when the flat phase error crosses an adaptive trigger level.

11. The horizontal sync detector of claim 7, wherein the horizontal sync detector portion is adapted to generate a position error.

12. The horizontal sync detector of claim 11, wherein the horizontal sync detector portion is adapted to generate a total error.

13. The horizontal sync detector of claim 12, wherein the total error is equal to a sum of the level error and the position error.

14. The horizontal sync detector of claim 13, wherein a sync event occurs when the total error is smallest over a line.

15. The horizontal sync detector of claim 1, wherein the filter portion is adapted to output a Demmer phase error to the horizontal sync detector portion.

16. The horizontal sync detector of claim 15, wherein stable low jitter lock is achieved when the Demmer phase error is selected when clean noise free standard video input is detected.

17. The horizontal sync detector of claim 6, wherein a Demmer sync event occurs when a sub window is triggered by a zero crossing of the flat phase error.

18. The horizontal sync detector of claim 9, wherein the potential sync events are adapted to produce at least one of a following error at the output logic portion:
   a coarse phase error; and
   a fine phase error.

19. The horizontal sync detector of claim 18, wherein a phase error is produced at the output logic portion.

20. The horizontal sync detector of claim 19, wherein the phase error is equal to a sum of the coarse phase error and the fine phase error.

21. A method for determining phase error in a sync detector, the method comprising:
   producing a flat phase error based on a flat filter output and on an equilibrium accumulator trigger level;
   producing a level error based on the flat phase error;
   producing a position error based on a modified pixel count;
   producing a total error based on the position error and on the level error;
   producing a coarse phase error based on the modified pixel count;
   producing a fine phase error based on the level error and a previous level error; and
   outputting a total phase error based on the fine phase error and the coarse phase error.

22. The method of claim 21, wherein the coarse phase error is equal to the modified pixel count.

23. The method of claim 22, wherein a pre-modified pixel count falls between 0 and pixels per line minus 1 (ppl−1).

24. The method of claim 23 further comprising modifying the pixel count to fall between −ppl/2 and ppl/2−1.

25. The method of claim 24 further comprising locking a horizontal phase-locked loop in a shortest time possible based on the modified pixel count between −ppl/2 and ppl/2−1.

26. The method of claim 25, wherein an absolute value of the modified pixel count is the position error.

27. The method of claim 21 further comprising producing the fine phase error by a divider.

28. The method of claim 27 further comprising generating an eight bit result which varies between −128 . . . 0 . . . +128 by the divider.

29. The method of claim 28 further comprising obtaining a perfect lock if the level error and the previous level error are centered about a trigger level such that a pixel count=an output pixel count=0.

30. The method of claim 29, wherein the modified pixel count is based on the pixel count.

31. The method of claim 29, wherein the trigger level is used to determine the flat phase error.

32. The method of claim 21 further comprising producing a valid sync event based on at least one of a following error from a list comprising:
   the flat phase error; and
   the total error.

33. The method of claim 32 further comprising updating buffer registers with a valid sync detected bit related to the valid sync event.

34. The method of claim 32 further comprising updating buffer registers with a valid sync detected bit for each valid sync event.

35. The method of claim 21 further comprising determining a difference between the flat filter output and the equilibrium accumulator trigger level to produce the flat phase error.

36. The method of claim 21 further comprising determining an absolute value of the modified pixel count to produce the position error.

37. The method of claim 21 further comprising adding the position error and the level error to produce the total error.

38. The method of claim 21 further comprising adding the fine phase error and the coarse phase error to produce the total phase error.

39. A method for determining phase error in a horizontal sync detector, the method comprising:
   receiving pixels at a plurality of filters;
   outputting a flat filter based on the filtered pixels to a plurality of accumulators;
   outputting a trigger level by the plurality of accumulators based on the flat filter output;
   producing a flat phase error based on the flat filter output and on the trigger level; and
   producing a level error based on the flat phase error.

40. The method of claim 39 further comprising, if a count of the received pixels reaches an output pixel count, updating output registers with contents of a buffer register.

41. The method of claim 40 further comprising modifying the pixel count.

42. The method of claim 41 further comprising producing a position error based on the modified pixel count.

43. The method of claim 42 further comprising producing a total error based on the position error and on the level error.

44. The method of claim 43 further comprising initializing a stored total error to a maximum value.

45. The method of claim 44 further comprising, if the total error is less than the stored total error, indicating that a valid sync event has occurred.

46. The method of claim 45 further comprising updating buffer registers with a coarse phase error based on the modified pixel count; the level error; and a previous level error.

47. The method of claim 46 further comprising producing a fine phase error based on the level error and the previous level error.

48. The method of claim 46 further comprising outputting a total phase error based on the fine phase error and the coarse phase error.

\* \* \* \* \*